(12) United States Patent
Chiu

(10) Patent No.: US 10,626,905 B1
(45) Date of Patent: Apr. 21, 2020

(54) SHELVING ASSEMBLY

(71) Applicant: Wu Hsu Chiu, Changhua County (TW)

(72) Inventor: Wu Hsu Chiu, Changhua County (TW)

( * ) Notice: Subject to any disclaimer, the term of this patent is extended or adjusted under 35 U.S.C. 154(b) by 0 days.

(21) Appl. No.: 16/368,978

(22) Filed: Mar. 29, 2019

(51) Int. Cl.
*F16B 12/34* (2006.01)
*A47B 96/14* (2006.01)
*A47B 57/54* (2006.01)

(52) U.S. Cl.
CPC .......... *F16B 12/34* (2013.01); *A47B 57/545* (2013.01); *A47B 96/1408* (2013.01)

(58) Field of Classification Search
CPC ............... F16B 12/34; F16B 2012/403; F16B 2012/443; F16B 12/40; F16B 12/44; F16B 12/48; F16B 12/52; A47B 57/545; A47B 96/1408
See application file for complete search history.

(56) References Cited

U.S. PATENT DOCUMENTS

| | | | | |
|---|---|---|---|---|
| 2,226,763 A * | 12/1940 | Geib | ...................... | A63H 33/06 446/116 |
| 2,992,744 A * | 7/1961 | Fohn | ...................... | A47B 57/22 108/157.13 |
| 3,056,507 A * | 10/1962 | Squires, Jr. | ............ | A47B 57/18 108/106 |
| 3,481,486 A * | 12/1969 | Squires | .................. | A47B 57/18 211/153 |
| 4,078,690 A * | 3/1978 | Goettl | ...................... | B65D 7/42 220/62 |
| 4,102,276 A * | 7/1978 | Roveroni | ............... | A47B 47/06 108/156 |
| 4,699,067 A * | 10/1987 | Okopny | .................... | A47F 5/10 108/108 |
| 5,463,966 A * | 11/1995 | Nilsson | ................... | A47B 57/50 108/110 |
| 5,481,988 A * | 1/1996 | Dess | ........................ | B66B 9/16 108/106 |
| 5,553,549 A * | 9/1996 | Nilsson | .................... | A47B 9/00 100/144 |
| 7,252,202 B2 * | 8/2007 | Saltzberg | ............... | A47B 57/50 211/187 |
| 7,255,237 B2 * | 8/2007 | Stitchick | .............. | A47B 47/022 211/106 |
| 7,421,957 B2 * | 9/2008 | Baez | ........................ | E04H 6/42 108/149 |
| 7,543,538 B2 * | 6/2009 | Baez | ...................... | A47B 96/00 108/149 |

(Continued)

*Primary Examiner* — Patrick D Hawn

(57) ABSTRACT

A shelving assembly includes at least one first post having an L-shaped section and including first apertures, two connection members at first ends respectively, and a retainer disposed on an outer surface of each connection member and including a neck and an enlarged head. A second post has an L-shaped section and includes second apertures and two T-shaped aperture members at second ends respectively. A size of the aperture member is greater than a diameter of the head. A length of the aperture member is at least 1.5 times of a diameter of the head. A width of a vertical part of the aperture member is greater than a diameter of the neck and smaller than the diameter of the head. The retainer passes through the aperture member to lock the neck in the vertical part, thereby joining the first and second posts.

2 Claims, 6 Drawing Sheets

(56) References Cited

U.S. PATENT DOCUMENTS

| | | | |
|---|---|---|---|
| 8,585,313 B2* | 11/2013 | Wojotowicz | A47B 87/0215 211/192 |
| 8,632,272 B2* | 1/2014 | Wojtowicz | A47B 87/0215 211/182 |
| 8,672,577 B2* | 3/2014 | Wojtowicz | A47B 87/0215 211/191 |
| 8,714,864 B2* | 5/2014 | Wojtowicz | A47B 87/0215 211/191 |
| 8,967,401 B2* | 3/2015 | Wu | A47B 47/0083 211/191 |
| 9,439,508 B2* | 9/2016 | Wojtowicz | A47B 87/0215 |
| 9,474,369 B1* | 10/2016 | Tsai | A47B 47/0083 |
| 9,629,455 B2* | 4/2017 | Shah | A47F 5/0892 |
| 9,723,925 B1* | 8/2017 | Tsai | A47B 47/0083 |
| 9,788,650 B2* | 10/2017 | Tsai | A47B 47/0083 |
| 2007/0007223 A1* | 1/2007 | Thrush | A47B 96/021 211/118 |
| 2007/0205169 A1* | 9/2007 | Fratilla | A47B 47/02 211/117 |
| 2011/0272373 A1* | 11/2011 | Wojtowicz | A47B 87/0215 211/134 |
| 2011/0272541 A1* | 11/2011 | Wojtowicz | A47B 87/0215 248/218.4 |
| 2011/0272542 A1* | 11/2011 | Wojtowicz | A47B 87/0215 248/218.4 |
| 2011/0272543 A1* | 11/2011 | Wojtowicz | A47B 87/0215 248/218.4 |
| 2014/0154001 A1* | 6/2014 | Wojtowicz | A47B 87/0215 403/293 |
| 2014/0284294 A1* | 9/2014 | Taylor | A47B 45/00 211/134 |
| 2015/0257530 A1* | 9/2015 | Naka | A47B 47/0091 211/188 |
| 2017/0211604 A1* | 7/2017 | Tsai | F16B 12/34 |
| 2019/0059588 A1* | 2/2019 | Liss | A47B 47/021 |

\* cited by examiner

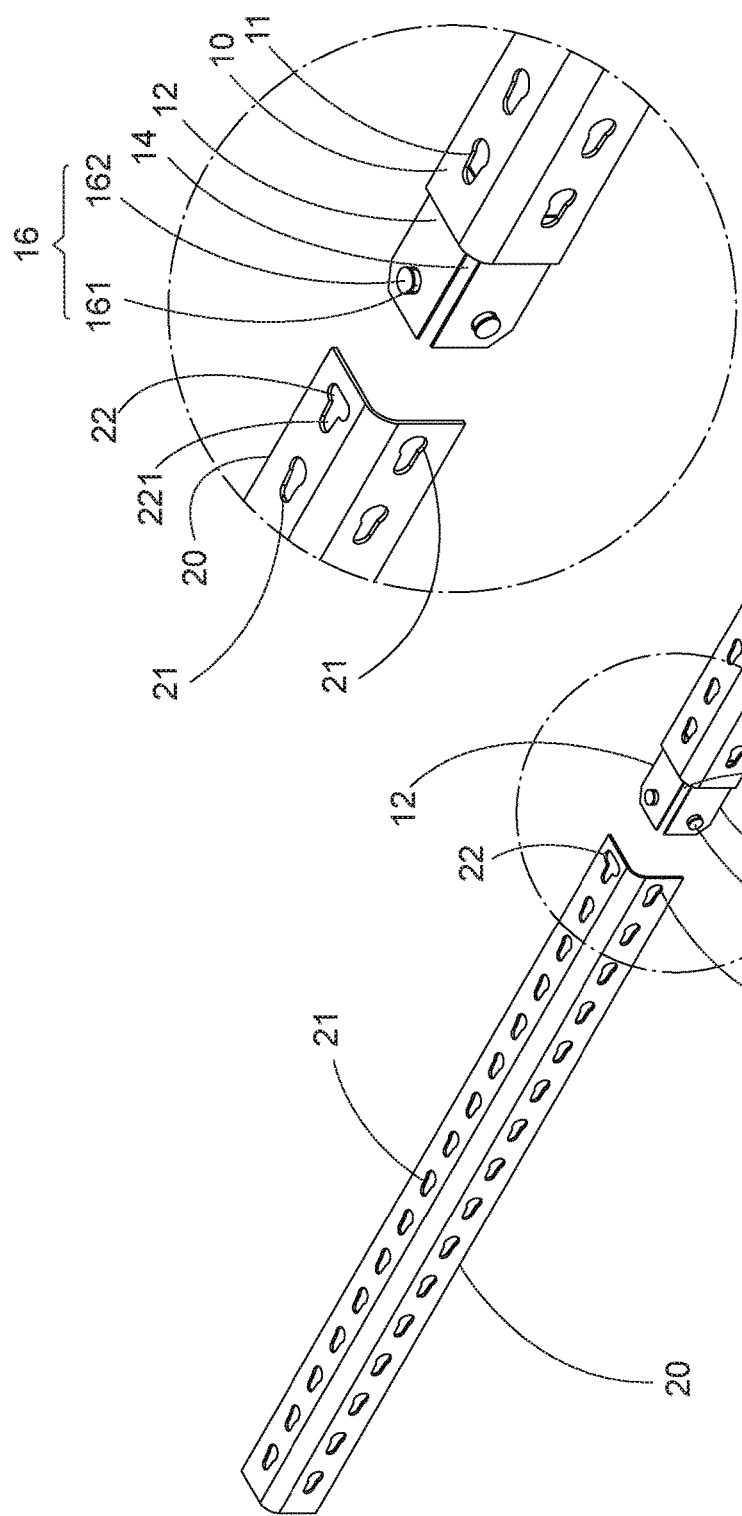
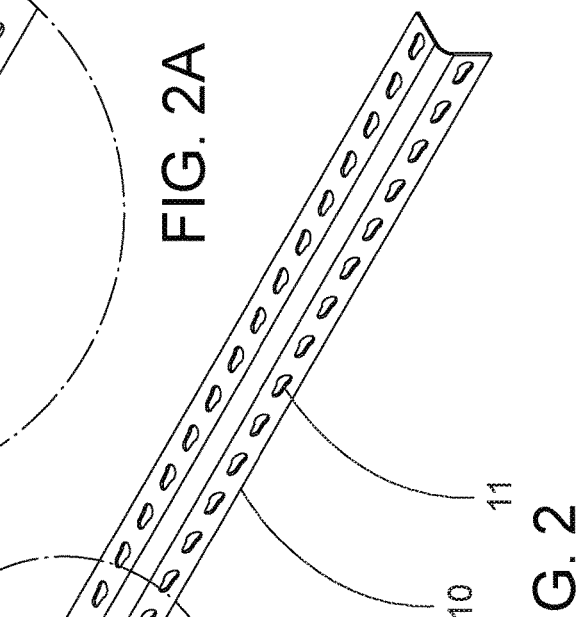
FIG. 2A
FIG. 2

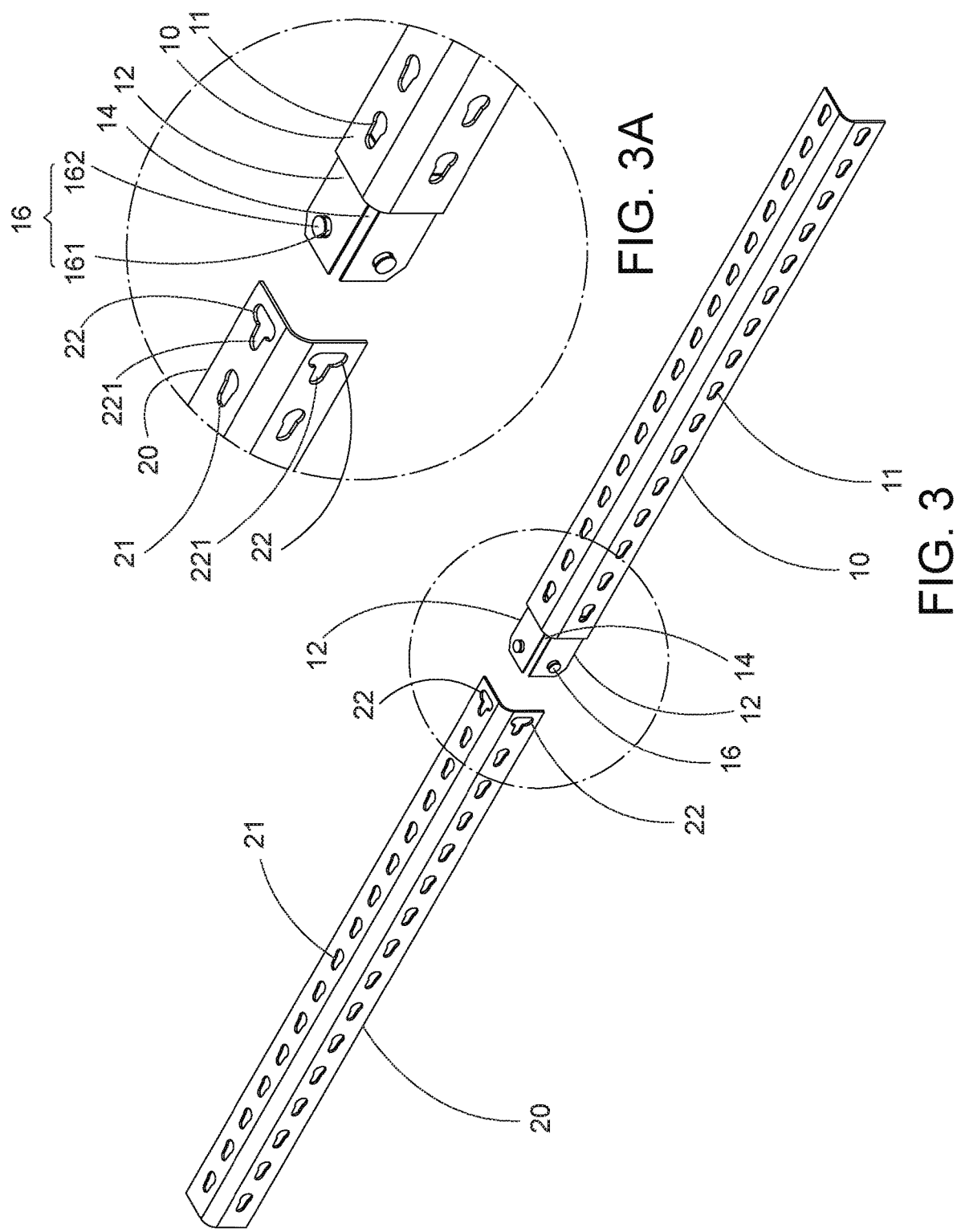

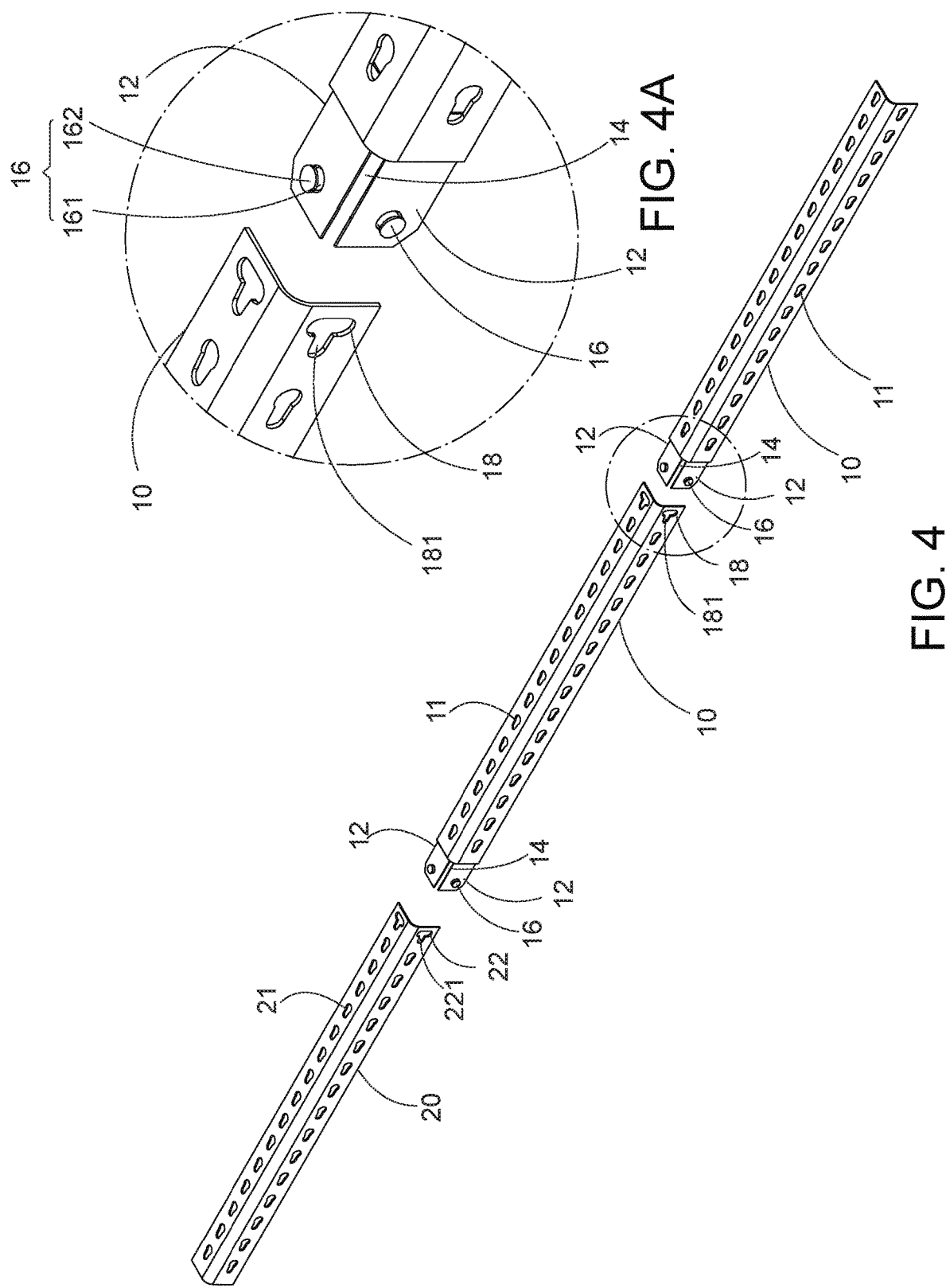

SHELVING ASSEMBLY

BACKGROUND OF THE INVENTION

1. Field of the Invention

The invention relates to shelving assemblies and more particularly to an adjustable shelving assembly made of metal having posts adapted to easily join to increase height of a complete shelving assembly to be ready for use.

2. Description of Related Art

Shelving assemblies made of metal are very popular because they purportedly provide users with the flexibility to assemble or build shelving units to the desired configurations and needs. In particular, the conventional modular shelving assemblies allow the user to adjust the distance between the shelves to facilitate storage of items of different shapes and sizes.

However, there are some drawbacks associated with the conventional modular shelving assemblies in the manufacturing process including cutting a metal tube into a variety of posts having different lengths based on specifications and being tedious. Further, some posts are too long to be delivered conveniently.

Thus, the need for improvement still exists.

SUMMARY OF THE INVENTION

It is therefore one object of the invention to provide a shelving assembly including at least one elongated first post, the first post being bent about 90-degree to have an L-shaped section and including a plurality of lengthwise, equally spaced first apertures, two connection members extending from first ends of two surface portions respectively, each connection member being parallel to the corresponding surface portion of the first post, and a retainer disposed on an outer surface of each connection member and including a neck and an enlarged head, and an elongated second post, the second post being bent at an approximate 90-degree angle to have an L-shaped section and including a plurality of lengthwise, equally spaced second apertures and two aperture members at second ends of two surface portions respectively wherein each aperture member is shaped as a T and includes a vertical part, a size of the aperture member is greater than a diameter of the head, a length of the aperture member is greater than or equal to 1.5 times of a diameter of the head, a width of the vertical part of the aperture member is greater than a diameter of the neck and smaller than the diameter of the head, and the retainer is configured to pass through the aperture member to lock the neck in the vertical part of the aperture member, thereby joining the first post and the second post.

Preferably, for increasing height of the assembled shelving assembly, there are provided two first posts wherein one first post further comprises two second aperture members at second ends of the surface portions respectively, and wherein each second aperture member is shaped as a T and includes a vertical part, a size of the second aperture member is greater than the diameter of the head, a length of the second aperture member is greater than or equal to 1.5 times of the diameter of the head, a width of the vertical part of the second aperture member is greater than the diameter of the neck and smaller than the diameter of the head, and the retainer is configured to pass through the second aperture member to lock the neck in the vertical part of the second aperture member, thereby joining one first post and the other first post.

The invention has the following advantages and benefits in comparison with the conventional art: it is possible to increase the height of the shelving assembly by joining the second post and the first post, and further joining the first post and another first post if desired. A metal tube can be cut into a variety of posts having different lengths based on specifications in a consistent manner. The posts can be delivered conveniently due to decreased length.

The above and other objects, features and advantages of the invention will become apparent from the following detailed description taken with the accompanying drawings.

BRIEF DESCRIPTION OF THE DRAWINGS

FIG. 2 is an exploded view of FIG. 1;

FIG. 2A is a detailed view of the area in a circle of FIG. 2;

FIG. 3 is an exploded view of a second configuration of the first preferred embodiment;

FIG. 3A is a detailed view of the area in a circle of FIG. 3 showing two T-shaped aperture members and two adjacent retainers;

FIG. 4 is an exploded view of a portion of a shelving assembly according to a second preferred embodiment of the invention;

FIG. 4A is a detailed view of the area in a circle of FIG. 4;

DETAILED DESCRIPTION OF THE INVENTION

Figure 1:
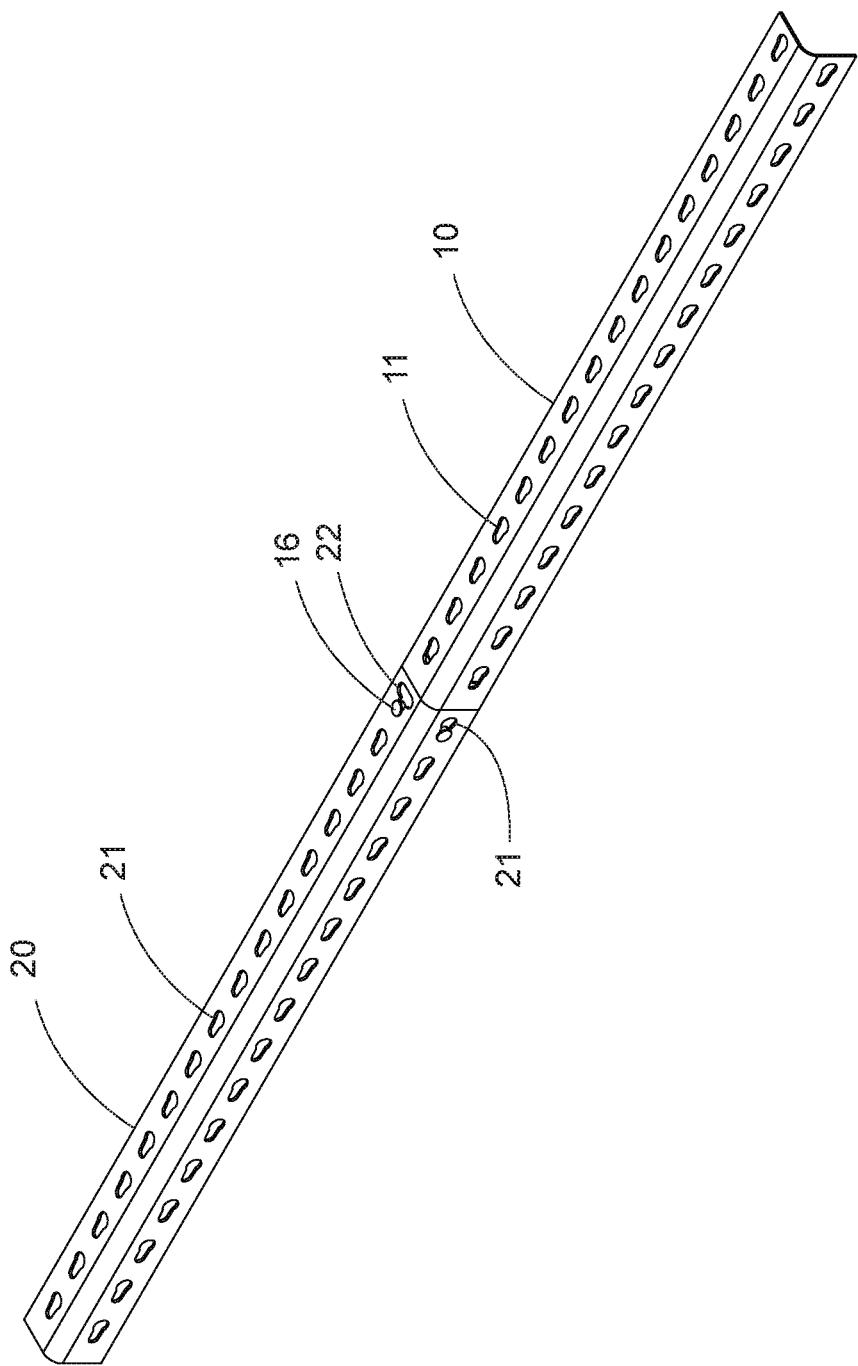
FIG. 1 is a perspective view of a portion of a shelving assembly according to a first configuration of a first preferred embodiment of the invention showing a retainer locked in a vertical part of a T-shaped aperture member.

Referring to FIGS. 1 to 2A, a shelving assembly in accordance with a first configuration of a first preferred embodiment of the invention includes a first post 10 and a second post 20.

The first post 10 is elongated and bent about 90-degree to have an L-shaped section. The first post 10 includes a plurality of lengthwise, equally spaced first apertures 11 and two connection members 12 extending from first ends of two surface portions respectively. Each connection member 12 is parallel to the corresponding surface portion of the first post 10. A retainer 16 is provided on an outer surface of each connection member 12 and includes a neck 161 and an enlarged head 162.

The second post 20 is elongated and being bent about 90-degree to have an L-shaped section. The second post 20 includes a plurality of lengthwise, equally spaced second apertures 21 and an aperture member 22 at a second end of one of two surface portions. The aperture member 22 is shaped as a T and includes a vertical part 221. The size of the aperture member 22 is greater than a diameter of the head 162 and the length of the aperture member 22 is greater than or equal to 1.5 times of a diameter of the head 162. The width of the vertical part 221 of the aperture member 22 is slightly greater than a diameter of the neck 161 and smaller than the diameter of the head 162. Thus, the retainer 16 may pass through the aperture member 22 to cause the neck 161 to be locked in the vertical part 221 of the aperture member 22, thereby joining the first post 10 and the second post 20. As a result, the height of the shelving assembly is increased.

As shown in FIGS. 2 and 2A specifically, the connection members 12 and the first post 10 are formed integrally, and a gap 14 is provided between the connection members 12. Alternatively, the gap 14 may be (or may be not) provided if the connection members 12 and the first post 10 are joined by soldering.

Referring to FIGS. 3 and 3A, a second configuration of the first preferred embodiment of the invention is shown. Differences between the first configuration and the second configuration are detailed below. In the first configuration shown in FIGS. 2 and 2A, the second post 20 includes only one T-shaped aperture member 22 and in the second configuration shown in FIGS. 3 and 3A, the second post 20 includes two T-shaped aperture members 22.

Referring to FIGS. 4 and 4A, a shelving assembly in accordance with a second preferred embodiment of the invention is shown. The characteristics of the second preferred embodiment are substantially the same as that of the second configuration of the first preferred embodiment except the following: Two first posts 10 are provided. One first post 10 includes two T-shaped aperture members 18 at second ends of two surface portions respectively. The other first post 10 includes a plurality of lengthwise, equally spaced first apertures 11 and two connection members 12 extending from first ends of two surface portions respectively. A retainer 16 is provided on an outer surface of each connection member 12 and includes a neck 161 and an enlarged head 162. The aperture member 18 includes a vertical part 181. The size of the aperture member 18 is greater than a diameter of the head 162 and the length of the aperture member 18 is greater than or equal to 1.5 times of a diameter of the head 162. The width of the vertical part 181 of the aperture member 18 is slightly greater than a diameter of the neck 161 and smaller than the diameter of the head 162. Thus, the retainer 16 may pass through the aperture member 18 to cause the neck 161 to be locked in the vertical part 181 of the aperture member 18, thereby joining one first post 10 and the other first post 10. Further, the retainer 16 of one first post 10 may pass through the aperture member 22 to cause the neck 161 to be locked in the vertical part 221 of the aperture member 22, thereby joining one first post 10 and the second post 20. As a result, the height of the shelving assembly is increased.

Figure 5A:
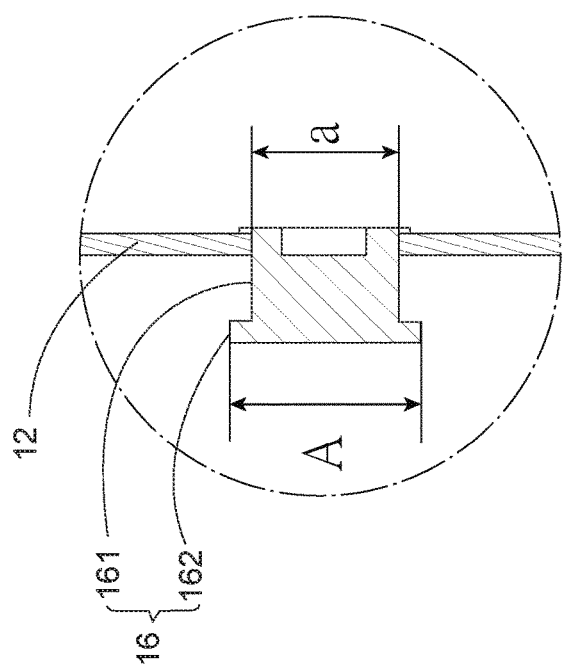
FIG. 5A a cross-sectional view of the retainer.
Figure 5B:
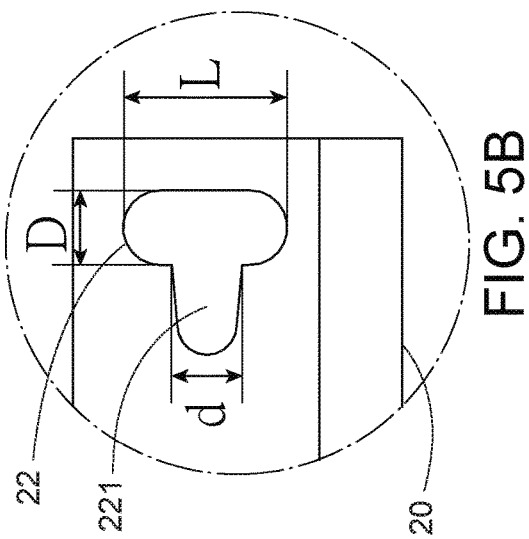
FIG. 5B is an enlarged view of the aperture member.
Figure 5:
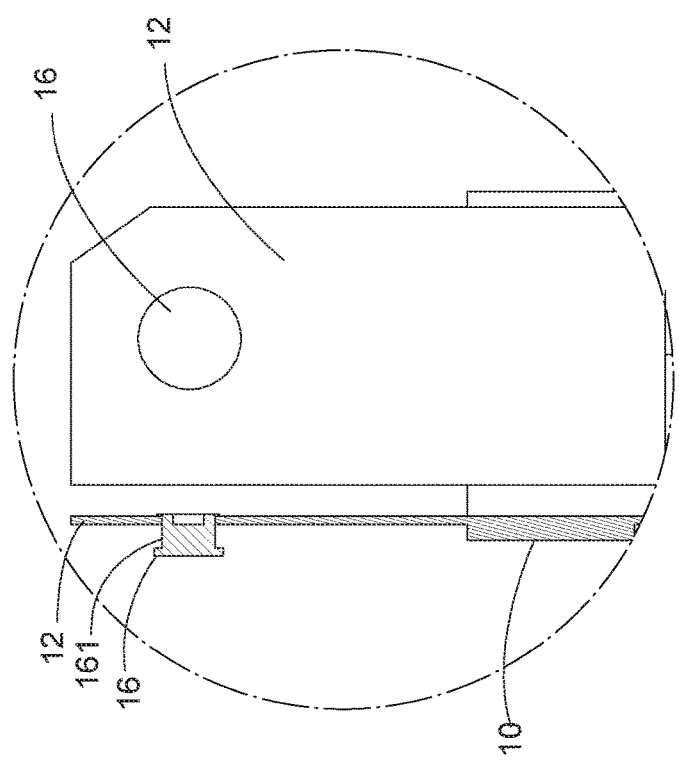
FIG. 5 is a plan view in part section of the connection members.

Referring to FIG. 5 in conjunction with FIGS. 2 to 4A, the retainer 16 is provided on either of the two connection members 12. As shown, the neck 161 of the retainer 16 has a decreased diameter. The width of the vertical part 181 of the aperture member 18 (or the width of the vertical part 221 of the aperture member 22) is slightly greater than the diameter of the neck 161. The retainer 16 may pass through the aperture member 18 to cause the neck 161 to be locked in the vertical part 181 of the aperture member 18 or the retainer 16 may pass through the aperture member 22 to cause the neck 161 to be locked in the vertical part 221 of the aperture member 22. It is noted that the size of the aperture member 22 or the aperture member 18 is greater than the diameter of the head 162.

Referring to FIGS. 5A and 5B in conjunction with FIG. 4, the diameter of the neck 161 of the retainer 16 is different from that of the head 162 of the retainer 16. As shown in FIG. 5A specifically, the diameter of the neck 161 is labeled a, and the diameter of the head 162 is labeled A. As shown in FIG. 5B specifically, on the second post 20 there are provided the T-shaped aperture members 22 including its vertical part 221 and the aperture member 22 has a diameter labeled D and the vertical part 221 has a width labeled d. In the above description, D>A, a<d<A, and L≥1.5A. Likewise, the aperture member 18 and its vertical part 181 have the same configuration including diameter, size and width as that of the aperture member 22 and its vertical part 221 shown in FIG. 5B if the aperture member 18 is shaped as a T.

Figure 6:
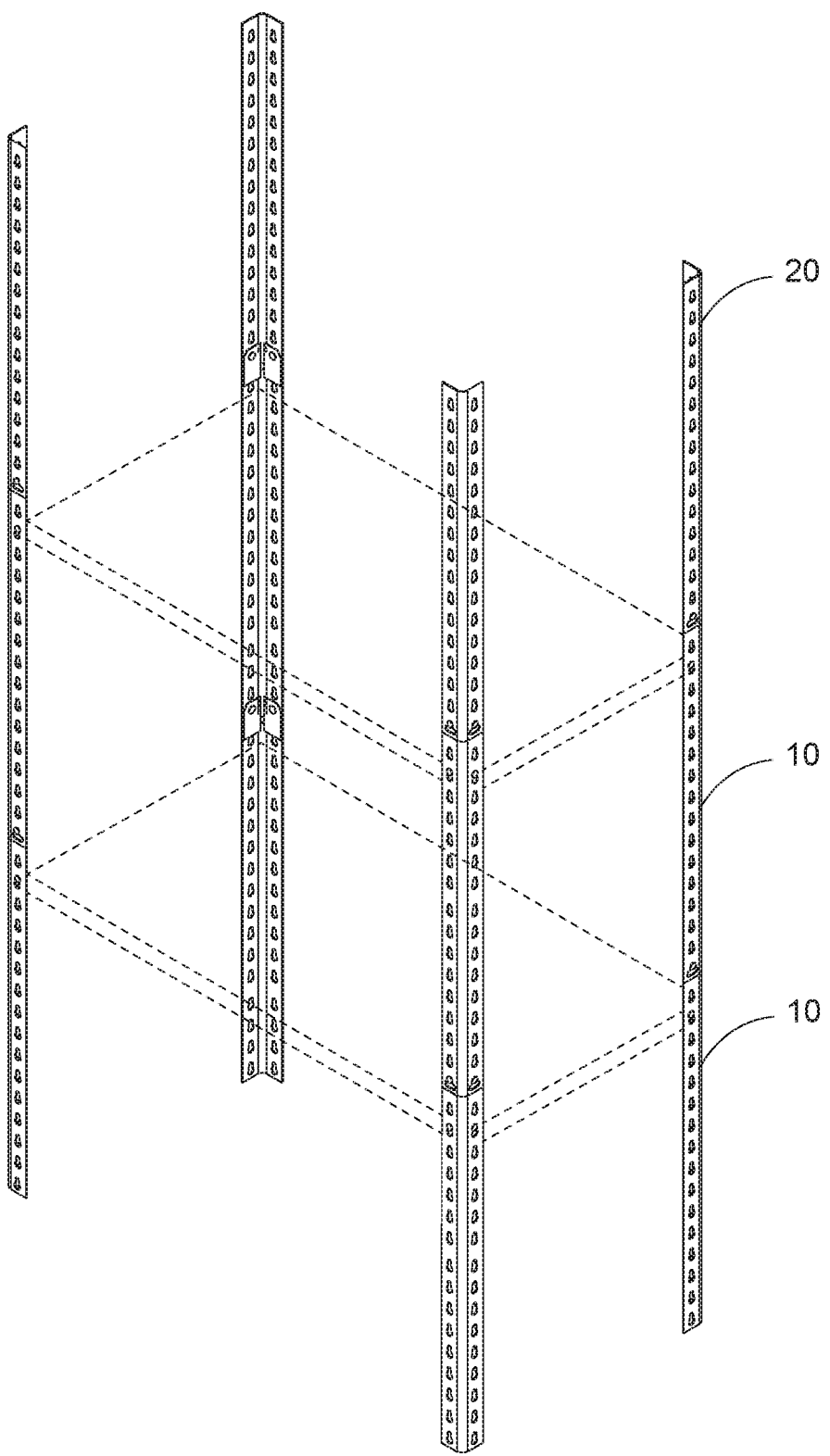
FIG. 6 is a perspective view of the shelving assembly of the invention.

Referring to FIG. 6, a shelving assembly of the invention is shown. Prior to assembly, the first posts 10 and the second posts 20 are stacked for ease of delivery. At the site of assembly, the first posts 10, the second posts 20 and trays (not numbered) can be quickly assembled to form a complete shelving assembly to be ready for use.

While the invention has been described in terms of preferred embodiments, those skilled in the art will recognize that the invention can be practiced with modifications within the spirit and scope of the appended claims.

What is claimed is:

1. A shelving assembly, comprising:
at least one elongated first post, the first post bent at an approximate 90-degree angle to have an L-shaped section, the L-shaped section consisting of two surface portions, and including a plurality of lengthwise, equally spaced first apertures,
wherein two connection members are fixed to and extend from first ends of the two surface portions, respectively, of the elongated first post, each of the two connection members being parallel to the corresponding surface portion of the first post, and including a gap between the two connection members, wherein a retainer is disposed on an outer surface of each of the two connection members and includes a neck and an enlarged head; and
an elongated second post, the second post bent at an approximate 90-degree angle to have an L-shaped section, the L-shaped section consisting of two surface portions, and including a plurality of lengthwise, equally spaced second apertures and an aperture member at second ends of each of the two surface portions respectively,
wherein each aperture member is shaped as a T and includes a vertical part, a size of the aperture member is greater than a diameter of the enlarged head, a length of the aperture member is greater than or equal to 1.5 times of a diameter of the enlarged head, a width of the vertical part of the aperture member is greater than a diameter of the neck and smaller than the diameter of the enlarged head, and the retainer is configured to pass through the aperture member to lock the neck in the vertical part of the aperture member, thereby joining the first post and the second post.

2. The shelving assembly of claim 1, wherein the at least one elongated first post is two elongated first posts, wherein one elongated first post further comprises two second aperture members at second ends of the surface portions respectively, and wherein the second aperture member is shaped as a T and includes a vertical part, a size of the second aperture member is greater than the diameter of the head, a length of the second aperture member is greater than or equal to 1.5 times of the diameter of the enlarged head, a width of the vertical part of the second aperture member is greater than the diameter of the neck and smaller than the diameter of the enlarged head, and the retainer is configured to pass through the second aperture member to lock the neck in the vertical part of the second aperture member, thereby joining one first post and the other first post.

\* \* \* \* \*